United States Patent [19]
Shiromura

[11] Patent Number: 6,068,326
[45] Date of Patent: May 30, 2000

[54] SUPPORT STRUCTURE FOR A CANVAS TOP BOW ON A CANVAS TOP AUTOMOBILE

[75] Inventor: Hiroyasu Shiromura, Hamamatsu, Japan

[73] Assignee: Suzuki Motor Corporation, Hamamatsu, Japan

[21] Appl. No.: 09/149,763

[22] Filed: Sep. 9, 1998

[30] Foreign Application Priority Data

Sep. 10, 1997 [JP] Japan ..................................... 9-244927

[51] Int. Cl.⁷ ....................................................... B60J 7/00
[52] U.S. Cl. ................. 296/120.1; 296/110; 296/107.16; 296/107.09
[58] Field of Search ................................ 296/120.1, 111, 296/121, 122, 110, 107.16, 107.09, 107.12

[56] References Cited

U.S. PATENT DOCUMENTS

| | | | |
|---|---|---|---|
| 4,260,188 | 4/1981 | Bauer | 296/107 |
| 4,310,194 | 1/1982 | Biller | 296/159 |
| 5,072,987 | 12/1991 | Allen | 296/107 |
| 5,499,855 | 3/1996 | Andres et al. | 296/121 |
| 5,551,745 | 9/1996 | Huang | 296/111 |
| 5,775,767 | 7/1998 | Harrison et al. | 296/107 |

*Primary Examiner*—D. Glenn Dayoan
*Assistant Examiner*—Lori L. Coletta
*Attorney, Agent, or Firm*—Finnegan, Henderson, Farabow, Garrett & Dunner, LLP

[57] ABSTRACT

There is provided a support structure for a canvas top bow on a canvas top automobile in which the upper part of a rear seat is made open, and a canvas top bow whose base portions are rotatably supported is erected on both sides of a vehicle body of the open portion to spread a canvas top, characterized in that an adjusting device 8 configured so that the tip end position of the canvas top bow 7 is movable at the stage of spreading the canvas top 3 and at the stage of loosening the canvas top 3 is provided at the base support portions of the canvas top bow 7, and a locking device 13 for keeping the canvas top bow 7 position at the stage of spreading the canvas top 7 bow is provided, whereby the attachment and detachment of the canvas top can be performed easily.

16 Claims, 9 Drawing Sheets

SUPPORT STRUCTURE FOR A CANVAS TOP BOW ON A CANVAS TOP AUTOMOBILE

FIELD OF THE INVENTION AND RELATED ART STATEMENT

The present invention relates to a support structure for a canvas top bow on a canvas top automobile.

Conventionally, there has been known a four-wheel-drive automobile or the like on which a canvas top is provided over a cargo bed to cover the cargo bed at the rear of a passenger compartment.

Figure 9:
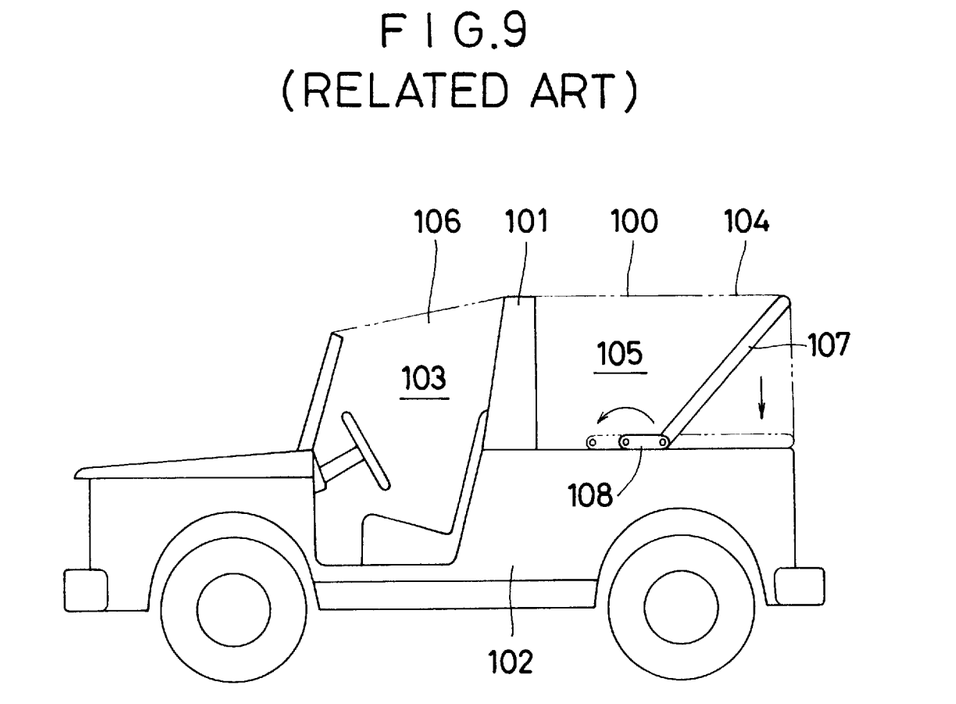
FIG. 9 is a schematic view showing a conventional canvas top automobile.

FIG. 9 shows an example of a canvas top automobile used as a four-wheel-drive automobile of this type.

On this canvas top automobile 100, a front seat 103, which is a driver seat, is provided in front of a rear pillar 101 on the front side of a vehicle body 102, and a rear seat 105, which is used for a cargo bed and the like, and covered with a canvas top 104, is provided at the rear of the rear pillar 101 on the rear side of the vehicle body 102.

On this canvas top automobile, a roof portion of the front seat 103 is formed with an opening 106, which is covered with the canvas top 104 collectively.

On the other hand, the rear seat 105 is provided with a gate-shaped canvas top bow 107 supported on both sides of the vehicle body 102. The canvas top bow 107 presses the rear end of the canvas top 104 by projecting the tip end of the canvas top bow 107 obliquely to the rear, by which the canvas top 104 is spread.

Figure 10:
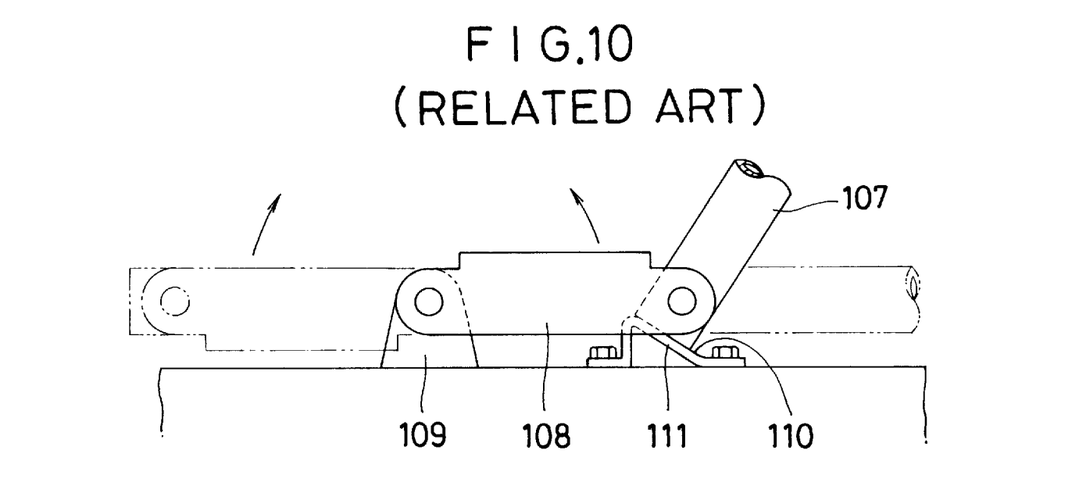
FIG. 10 is an enlarged side view of a link shown in FIG. 9.
Figure 11:
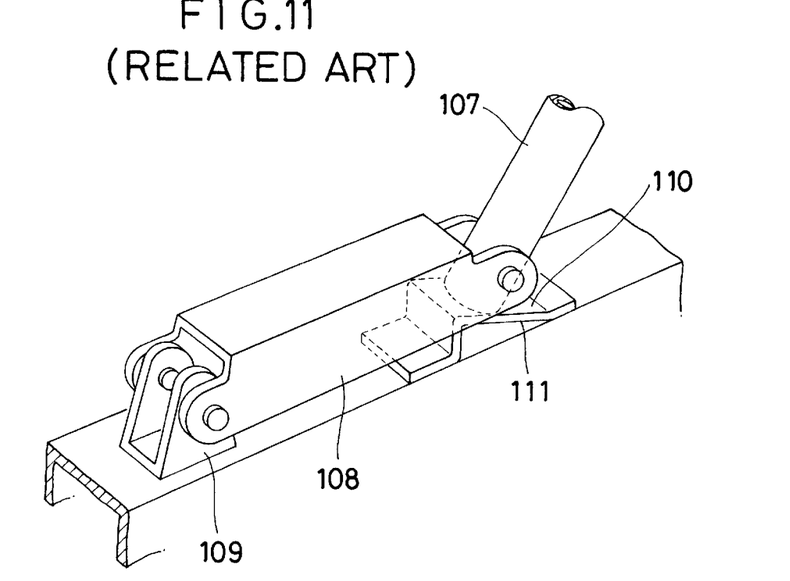
FIG. 11 is a perspective view of the link shown in FIG. 10.

The support structure for the canvas top bow 107 is, as shown in FIGS. 10 and 11, such that link members 108 are mounted at right and left lower parts, and the canvas top bow 107 is rotatably supported by support members 109, which are provided at the sides of the vehicle body 102, via the link members 108.

The canvas top bow 107 provides tension to the canvas top 104 by projecting the tip end thereof in the oblique upper direction to the rear of the vehicle body.

At a position where the link member 108 pivotally supported by the support member 109 is turned to the rear side of the vehicle body, a tapered member 111 having a tapered surface 110 is provided. The canvas top bow 107 is erected in the oblique rear direction by pressing the base portion of the canvas top bow 107 on the tapered surface 110 of the tapered member 111.

Figure 12:
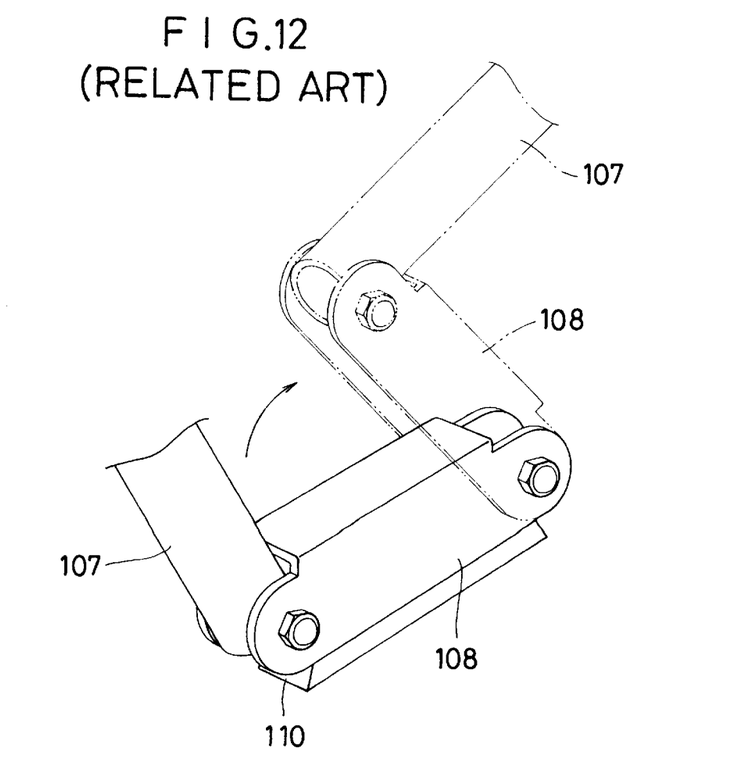
FIG. 12 is a schematic view showing the movement of the link shown in FIG. 11.

According to the above-described prior art, since the link member 108 is not fixed to the lower end part of the canvas top bow 107, as shown in FIG. 12, when the canvas top bow 107 is moved, the right and left link mechanisms move separately, which makes the operation difficult to perform. Also, since the link members 108 and other members are formed of a steel plate or the like, the link members 108 and other members are exposed to the outside, which undesirably mars the appearance.

Figure 13:
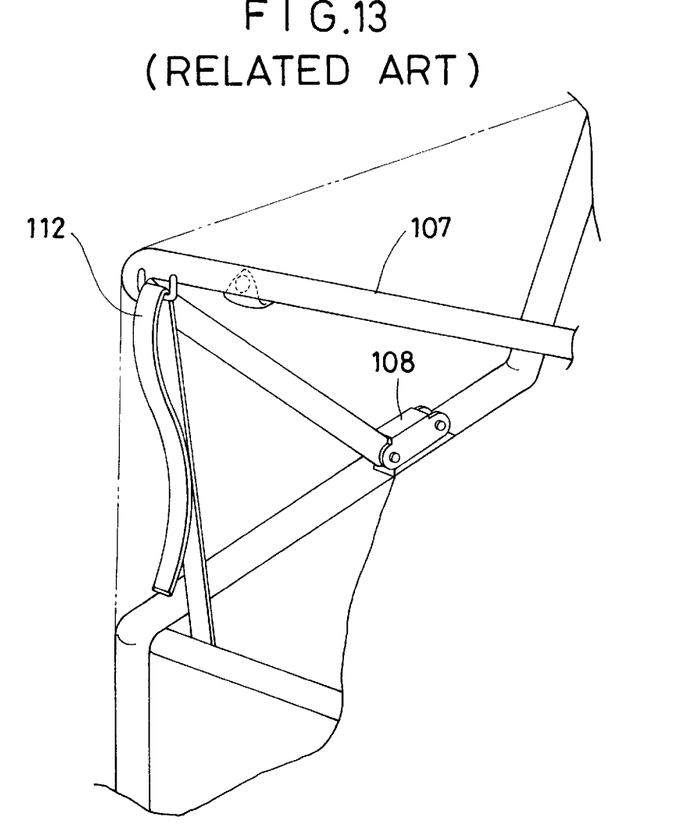
FIG. 13 is a perspective view showing a conventional canvas top bow fixing method.
Figure 14:
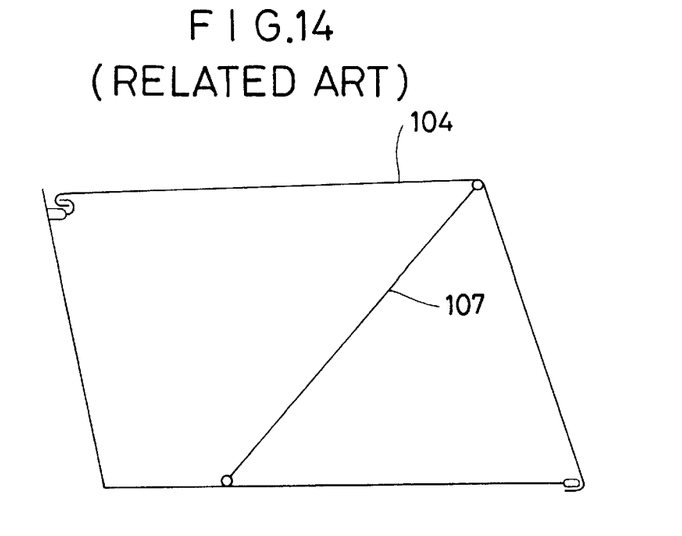
FIG. 14 is a schematic view for illustrating the movement of a conventional canvas top bow.

In order to fix the link member 108, the canvas top bow 107 may be pulled from the rear side by using a belt 112 and the like as shown in FIG. 13. In this case, however, the belt 112 and the like are needed, which undesirably increases the number of parts. Also, if the link member 108 is not used, the canvas top bow 107 stretches against the canvas top 104 as shown in FIG. 14 when the canvas top 104 is detached, so that it is difficult to fold the canvas top bow 107.

OBJECT AND SUMMARY OF THE INVENTION

An object of the present invention is to provide a support structure for a canvas top bow on a canvas top automobile in which the above problems can be solved, and the attachment and detachment of a canvas top can be performed easily.

To achieve the above object, the present invention provides a support structure for a canvas top bow on a canvas top automobile having a canvas top and a vehicle body in which the upper portion of a rear seat is selectively exposed, and a canvas top bow, whose base portions are rotatably supported, is erected on both sides of a vehicle body of the open portion to spread a canvas top, characterized in that an adjusting device configured so that the tip end position of the canvas top bow is movable at the stage of spreading the canvas top and at the stage of loosening the canvas top is provided at the base support portions of the canvas top bow, and a locking device for keeping the canvas top bow position at the stage of spreading the canvas top.

Also, the present invention provides a support structure for a canvas top bow on a canvas top automobile in which the upper portion of a rear seat is selectively open, and a canvas top bow whose right and left base portions are rotatably supported is erected in the oblique rear direction on both sides of a vehicle body of the open portion and press the rear upper end portion of a canvas top to spread the canvas top, characterized in that an adjusting device configured so that the tip end position of the canvas top bow is movable at the stage of spreading the canvas top and at the stage of loosening the canvas top is provided at the right and left base support portions of the canvas top bow, a link mechanism for changing an operation point position without changing a fulcrum position of the base portion of the canvas top is used as the adjusting devices and a locking device for keeping the canvas top bow position at the stage of spreading the canvas top bow is provided.

Further, the present invention provides a support structure for a canvas top bow on a canvas top automobile in which the upper portion of a rear seat is selectively exposed, and a canvas top bow whose right and left base portions are rotatably supported is erected in the oblique rear direction on both sides of a vehicle body of the open portion and press the rear upper end portion of a canvas top to spread the canvas top, characterized in that a pair of handle portions are provided on both sides of a vehicle body so as to be turnable in the longitudinal direction of the vehicle body, the base portion of the canvas top bow is pivotally supported at a halfway position of the handle portion, a locking device for fixing the handle portion and the base portion is provided at the handle portion and the base portion, a stage of spreading the canvas top is configured at which the canvas top is spread by fixing the handle portion and the base portion and by pressing the tip end of the canvas top bow to the canvas top side, and the handle portion is released from the base portion and turned, by which the tip end of the canvas top bow is separated from the canvas top side by changing an operation point position without changing a fulcrum position of the base portion of the canvas top bow, and a link function for configuring a stage of loosening the canvas top is provided to the handle portion.

Still further, the present invention is characterized in that an engagement convex which is projected and retracted in the axial direction by a spring means is provided at either one of the base portion of the canvas top bow and the handle portion, an engagement concave engaging with the engagement convex is provided at the other of these two elements, and a locking device is provided which fixes the base portion of the canvas top bow to the handle portion by engaging the engagement convex with the engagement concave, and releases the base portion of the canvas top bow from the handle portion by disengaging the engagement convex from the engagement concave.

Also, the present invention is characterized in that the transverse cross section of the handle portion is formed into a substantially U shape, and the base portion of the canvas top bow is pivotally supported at a halfway position of the inside of the substantially U-shaped portion.

According to the present invention, since the locking device for keeping the canvas top bow position at a stage of spreading the canvas top is provided, the right and left base portions can be operated simultaneously when the canvas top bow is operated, so that the work for spreading the canvas top or detaching it can be performed easily. In particular, since the handle portion can be used as a lever when the canvas top is spread, the work for spreading the canvas top can be performed easily.

The support structure for a canvas top bow on a canvas top automobile in accordance with the present invention achieves the effects as described below.

According to the present invention, in a support structure for a canvas top bow on a canvas top automobile in which the upper portion of a rear seat is selectively exposed, and a canvas top bow whose base portions are rotatably supported is erected on both sides of a vehicle body of the open portion to spread a canvas top, an adjusting device configured so that the tip end position of the canvas top bow is movable at the stage of spreading the canvas top and at the stage of loosening the canvas top is provided at the base support portions of the canvas top bow, and a locking device for keeping the canvas top bow position at the stage of spreading the canvas top bow is provided. Therefore, the attachment and detachment of the canvas top can be performed easily. Also, since the right and left base portions of the canvas top bow do not move separately, the operation is made easy when the canvas top is attached or detached.

Also, according to the present invention, in a support structure for a canvas top bow on a canvas top automobile in which the upper portion of a rear seat is selectively exposed, and a canvas top bow whose right and left base portions are rotatably supported is erected in the oblique rear direction on both sides of a vehicle body of the open portion and press the rear upper end portion of a canvas top to spread the canvas top, an adjusting device configured so that the tip end position of the canvas top bow is movable at the stage of spreading the canvas top and at the stage of loosening the canvas top is provided at the right and left base support portions of the canvas top bow, a link mechanism for changing an operation point position without changing a fulcrum position of the base portion of the canvas top is used as the adjusting device, and a locking device for keeping the canvas top bow position at the stage of spreading the canvas top bow is provided. Therefore, since the tip end position of the canvas top bow can be stretched and contracted, the attachment and detachment of the canvas top can be performed easily. Also, since the right and left base portions of the canvas top bow do not move separately, the operation is made easy when the canvas top is attached or detached.

Further, according to the present invention, in a support structure for a canvas top bow on a canvas top automobile in which the upper portion of a rear seat selectively exposed, and a canvas top bow whose right and left base portions are rotatably supported is erected in the oblique rear direction on both sides of a vehicle body of the open portion and press the rear upper end portion of a canvas top to spread the canvas top, a pair of handle portions are provided on both sides of a vehicle body so as to be turnable in the longitudinal direction of the vehicle body, the base portion of the canvas top bow is pivotally supported at a halfway position of the handle portion, a locking device for fixing the handle portion and the base portion is provided at the handle portion and the base portion, a stage of spreading the canvas top is configured at which the canvas top is spread by fixing the handle portion and the base portion and by pressing the tip end of the canvas top bow to the canvas top side, and the handle portion is released from the base portion and turned, by which the tip end of the canvas top bow is separated from the canvas top side by changing an operation point position without changing a fulcrum position of the base portion of the canvas top bow, and a link function for configuring a stage of loosening the canvas top is provided to the handle portion. Therefore, since the tip end position of the canvas top bow can be stretched and contracted, the attachment and detachment of the canvas top can be performed easily. Also, since the right and left base portions of the canvas top bow do not move separately, the operation is made easy when the canvas top is attached or detached. Further, since the canvas top bow is operated by grasping the handle portion, the canvas top bow can be operated with a small force by the action of levers.

According to the present invention, an engagement convex which is projected and retracted in the axial direction by a spring means is provided at either one of the base portion of the canvas top bow and the handle portion, an engagement concave engaging with the engagement convex is provided at the other of these two elements, and a locking device is provided which fixes the base portion of the canvas top bow to the handle portion by engaging the engagement convex with the engagement concave, and releases the base portion of the canvas top bow from the handle portion by disengaging the engagement convex from the engagement concave. Therefore, by combining the handle portion with the base portion of the canvas top bow, the engagement convex can be engaged with the engagement concave by the action of the spring means, so that the base portion of the canvas top bow and the handle portion can be fixed easily.

Also, according to the present invention, the transverse cross section of the handle portion is formed into a substantially U shape, and the base portion of the canvas top bow is pivotally supported at a halfway position of the inside of the substantially U-shaped portion. Therefore, since the pivotally supporting portion of the base portion of the canvas top bow is hidden by the substantially U-shaped portion, the appearance can be improved.

BRIEF DESCRIPTION OF THE DRAWINGS

FIG. 2 shows the canvas top bow shown in FIG. 1, FIG. 2(a) being a front view, and FIG. 2(b) being a right side view of FIG. 2(a);

DETAILED DESCRIPTION OF PREFERRED EMBODIMENTS

An embodiment of the present invention will be described in detail with reference to the accompanying drawings.

Figure 1:
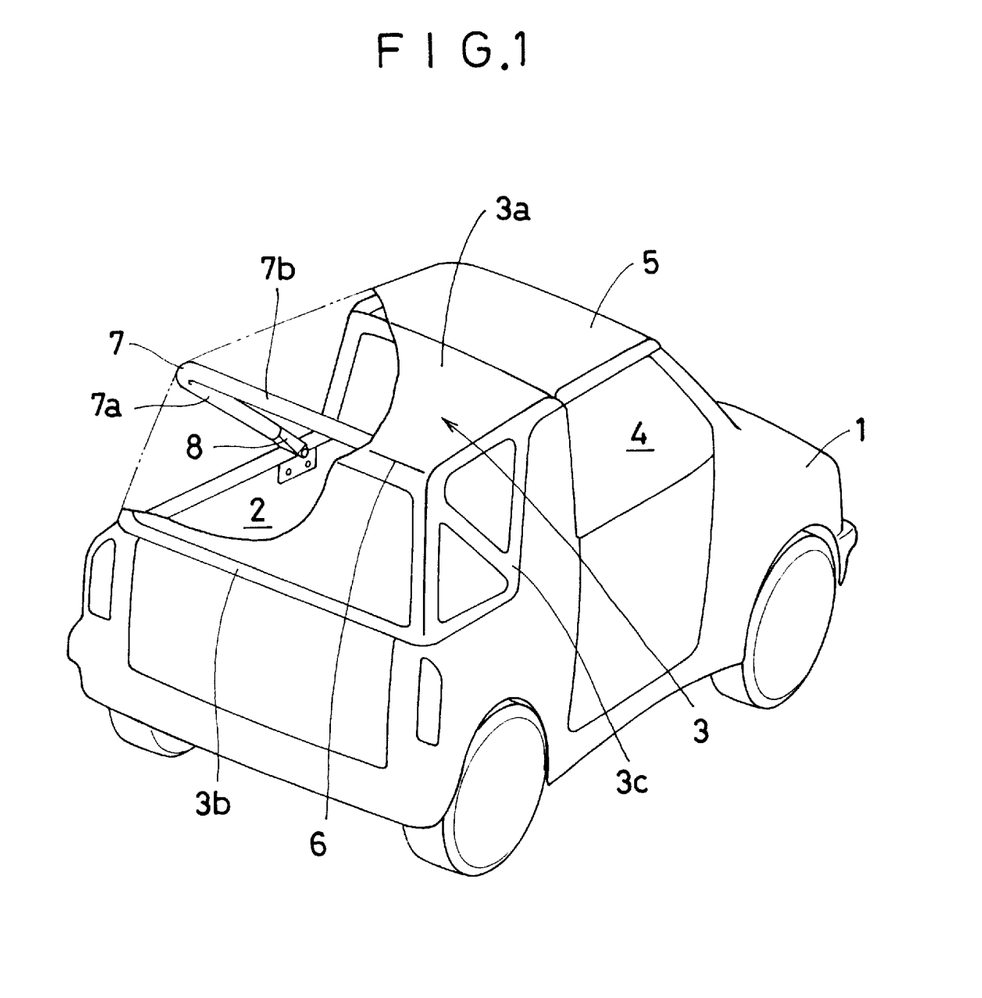
FIG. 1 is a perspective view showing an embodiment of a support structure for a canvas top bow on a canvas top automobile in accordance with the present invention.

FIG. 1 shows a canvas top automobile used as a four-wheel-drive automobile. A vehicle body 1 of this canvas top automobile is provided with a canvas top 3 covering an upper space of a rear seat 2 at which a cargo bed or the like is provided. In some embodiments, this canvas top 3 collectively covers a roof portion 5 of a front seat 4 at which a driver seat is provided, and in other embodiments, the front seat 4 is covered with a separate canvas top, and the canvas top 3 covers only the rear seat 2.

The canvas top 3 is of a box shape, consisting of a canvas cloth 3a constituting a ceiling face, a canvas cloth 3b constituting a rear face, and canvas cloths 3c, 3c constituting both side faces. A joint portion 6 between the canvas cloth 3a constituting the ceiling face and the canvas cloth 3b constituting the rear face is supported by a gate-shaped canvas top bow 7 provided at the rear seat 2.

Figure 2A:
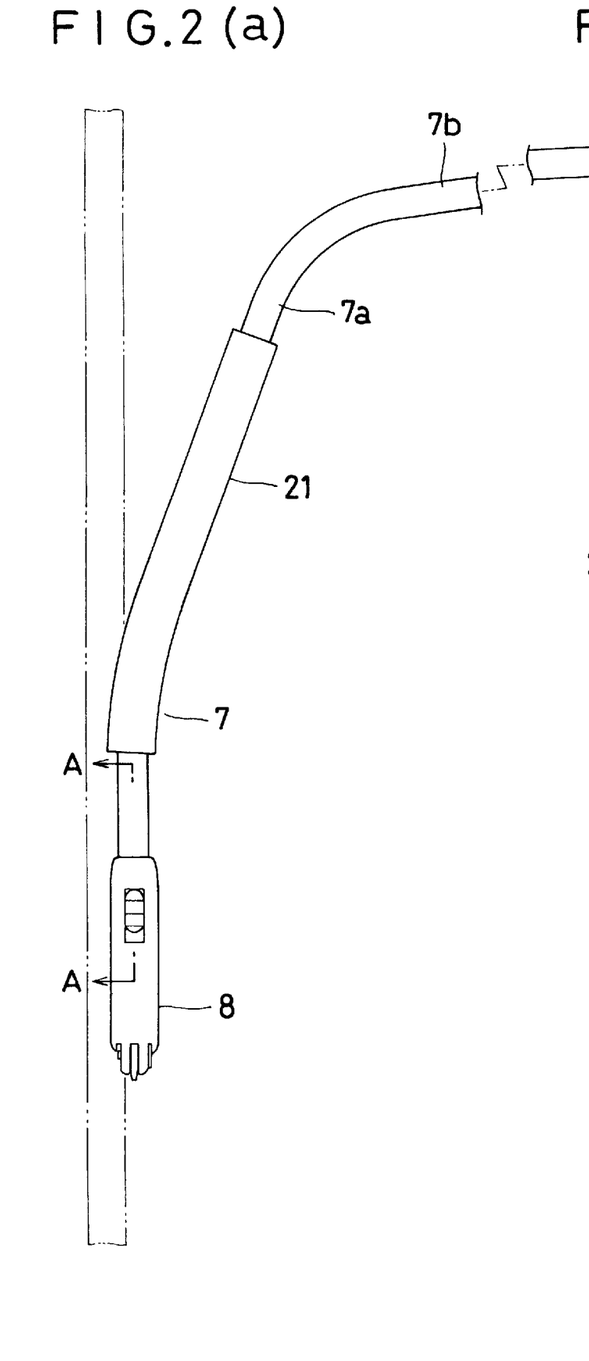
Figure 2B:
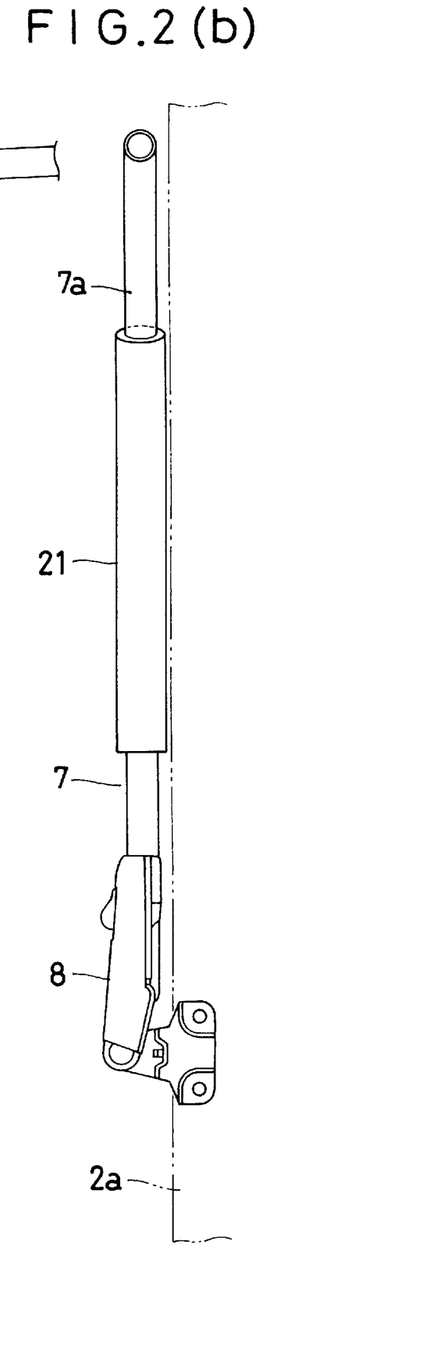

As shown in FIGS. 2(a) and 2(b), the canvas top bow 7 is made up of right and left frame portions 7a and a frame portion 7b connected to the right and left frame portions 7a. At the lower end parts of the right and left frame portions 7a of the canvas top bow 7, that is, at the base support portions of the canvas top bow 7, an adjusting device 8 is provided. The canvas top bow 7 is supported on the right and left vehicle body side 2a portions of the rear seat 2 via the respective adjusting devices 8. The frame portions 7a and the frame portion 7b of the canvas top bow 7 are usually constructed by one pipe frame bent into a gate shape.

The adjusting device 8 provided at the lower part of the right and left frame portions 7a will be described with reference to FIGS. 3 to 7.

Figure 3:
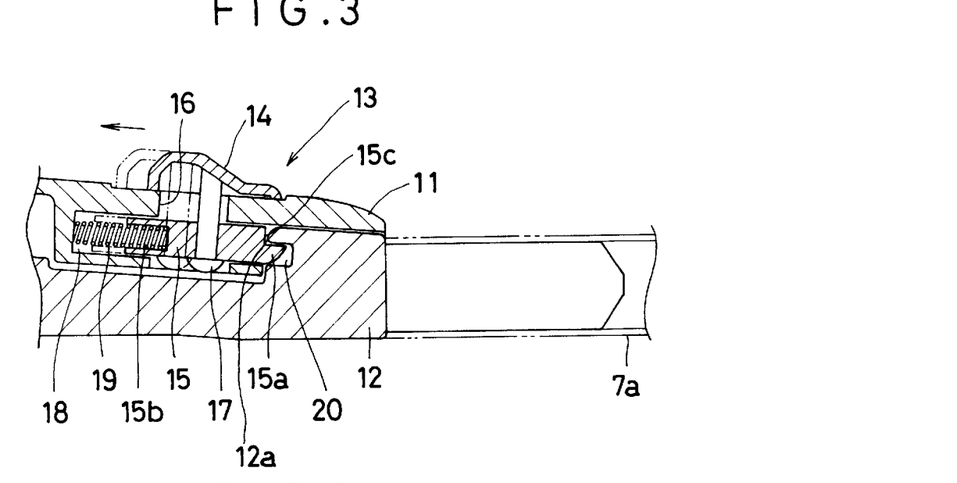
FIG. 3 is a sectional view taken along the line A—A of FIG. 2(a)
Figure 4:
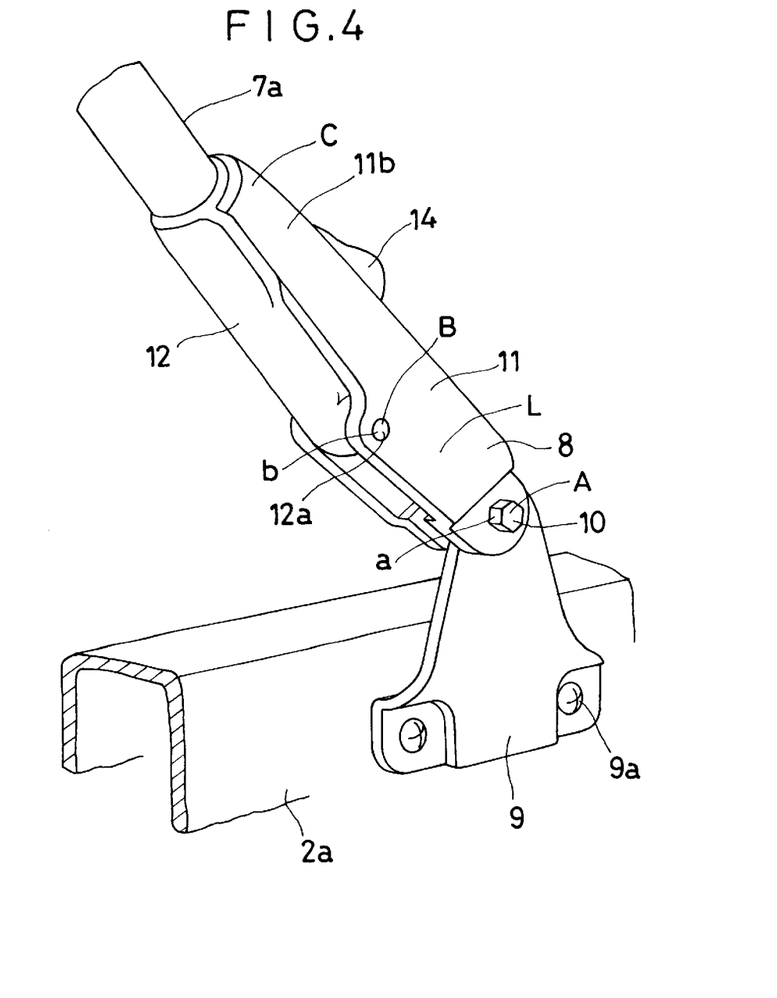
FIG. 4 is an enlarged perspective view of an adjusting device shown in FIG. 1.
Figure 5:
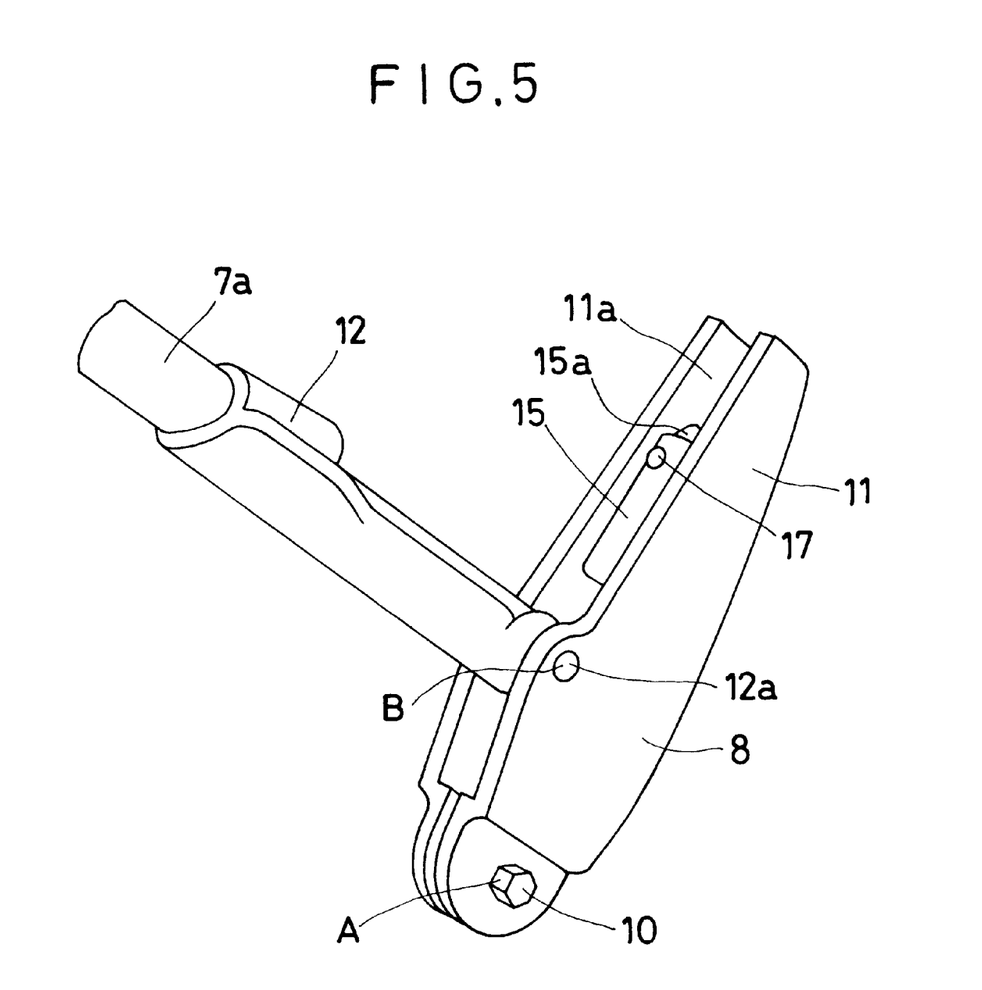
FIG. 5 is a perspective view showing a state in which a handle portion of the adjusting device shown in FIG. 4 is opened.
Figure 6:
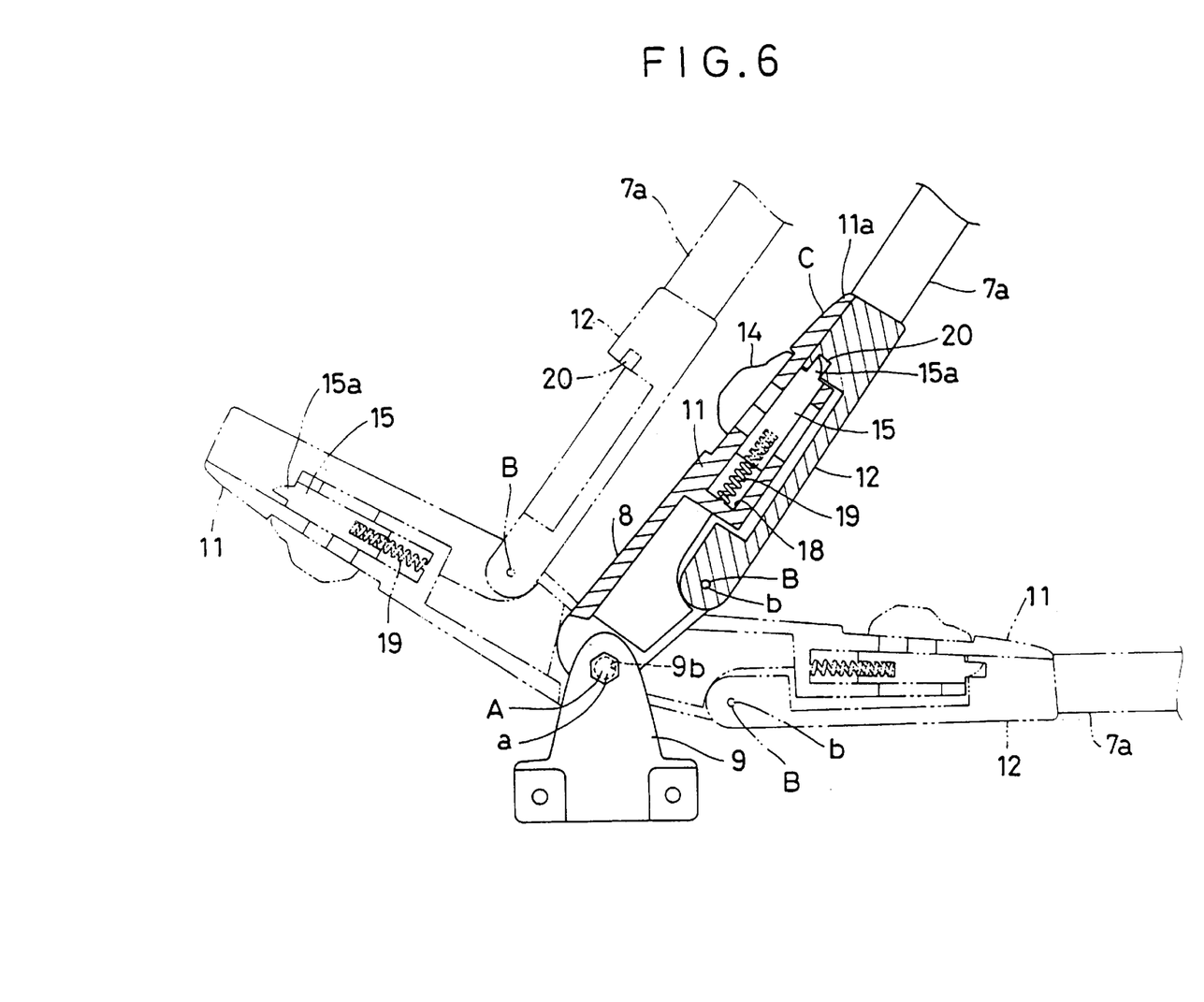
FIG. 6 is a side view showing a state in which the adjusting device shown in FIG. 1 is used.
Figure 7:
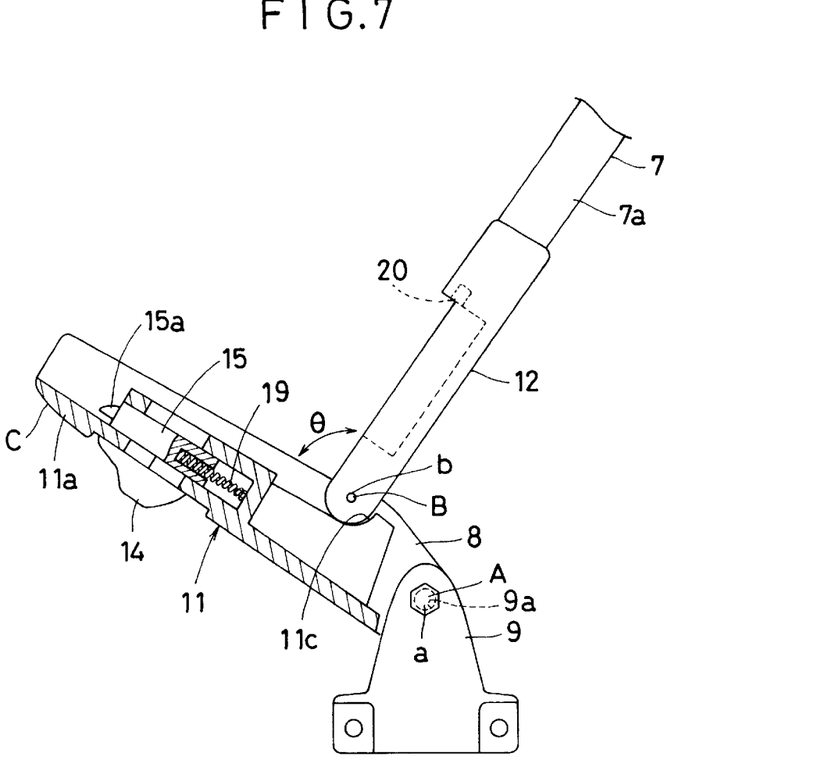
FIG. 7 is a side view showing a state in which the adjusting device shown in FIG. 1 is used.

A bracket 9 is threadedly attached to the vehicle body side 2 on the vehicle body front side of the rear seat 2a via screws 9a or the like. This bracket 9 has a substantially triangular shape, and formed with a mounting hole 9b at the upper end portion thereof.

To the mounting hole 9b of the bracket 9, a handle portion 11 is pivotally attached via a bolt 10 or the like so as to be rotatable.

This handle portion 11 is formed of a resin material into a substantially U shape in transverse cross section. At a halfway position of the handle portion 11 is pivotally supported a pivot portion 12 via a pivot shaft 12a.

This pivot portion 12 is mounted to the lower end part of the frame portion 7a, and is formed so as to be rotatable with respect to the handle portion 11 by being combined with the opening inside of the substantially U-shaped portion 11a of the handle portion 11.

For the handle portion 11, the pivotally supporting portion a for the bracket 9 (the position of the bolt 10 pivotally supporting the handle portion 11) acts as a fulcrum A of the principle of levers, the handle portion 11 being a lever, and the pivotally supporting portion b for the pivot portion 12 (the position of the pivot shaft 12a) acts as an operation point B of the principle of levers. For the handle portion 11, the portion from the pivotally supporting portion a for the handle portion 11 to the pivotally supporting portion b for the pivot portion 12 has a link function as a link mechanism L at the adjusting device 8, and the tip end of the pivotally supporting portion is a handle portion body 11b as an effort point C for operating the adjusting device 8 by the principle of levers. In the opening of the substantially U-shaped portion 11a of the handle portion 11, an arcuate stopper wall 11c is formed which engages with the side end of the pivotally supporting portion b of the pivot portion 12 to restrict the turning angle of the handle portion 11 to a fixed angle θ when the handle portion 11 is turned. This stopper wall 11c can keep the pivot portion 12 at a fixed angle θ by fixing the handle portion 11.

Also, the handle portion 11 is provided with a locking device 13 for fixing the pivot portion 12, that is, the frame portion 7a of the canvas top bow 7 to the handle portion 11.

The locking device 13 is, as shown in detail sectionally in FIG. 3, made up of an operation button 14 disposed slidably in the axial direction on the surface side of the handle portion 11, a pin 15 disposed on the back face side of the handle portion 11, a screw 17 which connects the operation button 14 to the pin 15 through a slit 16 formed in the handle portion 11, and a spring 19 which is incorporated in a cylindrical chamber 18 provided in the axial direction on the back face side of the handle portion 11 to urge the pin 15 in the axial direction.

On the other hand, an engagement concave 20 with which the pin 15 engages is formed on the surface opposite to the pin 15 on the wall surface of the pivot portion 12.

The pin 15 is provided with a claw 15a serving as an engagement convex engaging with the engagement concave 20 at one end thereof. At the other end of the pin 15, a concave 15b is provided with which one end of the spring 19 incorporated in the chamber 18 engages, so that the urging force of the spring 19 is transmitted to the pin 15. On the inside wall surface of the handle portion 11 where the claw 15a of the pin 15 is provided, a step portion 15c is provided which engages with the engagement concave 20 of the pivot portion 12.

A protector 21 for protection is mounted around the right and left frame portions 7a of the canvas top bow 7. This protector 21 prevents the vehicle body 1 from being damaged when the canvas top 3 is stored by pushing the canvas top bow 7 down, and also serves as a holding portion for holding the frame portion 7a by hand when the frame portion 7a is operated.

The following is a description of the operation of the support structure for a canvas top bow on the canvas top automobile configured as described above.

First, the case where the canvas top 3 is spread will be explained.

The joint portion 6 of the canvas top 3 between the canvas cloth 3a constituting the ceiling face and the canvas cloth 3b constituting the rear face is attached to the frame portion 7b of the canvas top bow 7 provided at the rear seat 2 by using a belt, a snap, or the like.

The pin 15 is operated by sliding the operation button 14 of the locking device 13 to push down the claw 15a of the pin 15 against the urging force of the spring 19, by which the claw 15a is released from the concave 20 of the pivot portion 12.

Next, the frame portion 7a of the canvas top bow 7 is turned so as to be erected in the oblique rear upper direction of the vehicle body 1 while grasping the protector 21 with the handle portion 11 being separated from the pivot portion 12 and turned. At this time, because the handle portion 11 is fixed, the frame portion 7a of the canvas top bow 7 is not tilted any more than is necessary because the pivot portion 12 is kept at a fixed angle θ with respect to the handle portion 11. Then, the tip end of the canvas cloth 3a constituting the ceiling face is fixed to the roof portion 5 or the like.

In this state, the canvas top 3 is spread with looseness.

Thus, when the handle portion 11 is turned to the pivot portion 12 side, the frame portion 7a of the canvas top bow 7 is pushed out gradually in the oblique upper rear direction as the pivotally supporting portion of the pivot portion 12 is turned rearward. The frame portion 7b of the tip end portion of the canvas top bow 7 is pushed out so that the joint portion 6 between the canvas cloth 3a constituting the ceiling face and the canvas cloth 3b constituting the rear face separates from the fulcrum A of the adjusting device 8, by which the canvas top 3 is spread with tension. After the spreading of the canvas top 3 is finished, the snaps and the like mounted around the canvas top 3 are fastened to the mating snaps and the like provided around the vehicle body 1, by which the canvas top 3 is fixed.

Next, the case where the canvas top 3 is removed will be explained. The pin 15 is operated by sliding the operation button 14 of the locking device 13 to push down the claw 15a of the pin 15 against the urging force of the spring 19, by which the claw 15a is released from the concave 20 of the pivot portion 12.

Figure 8:
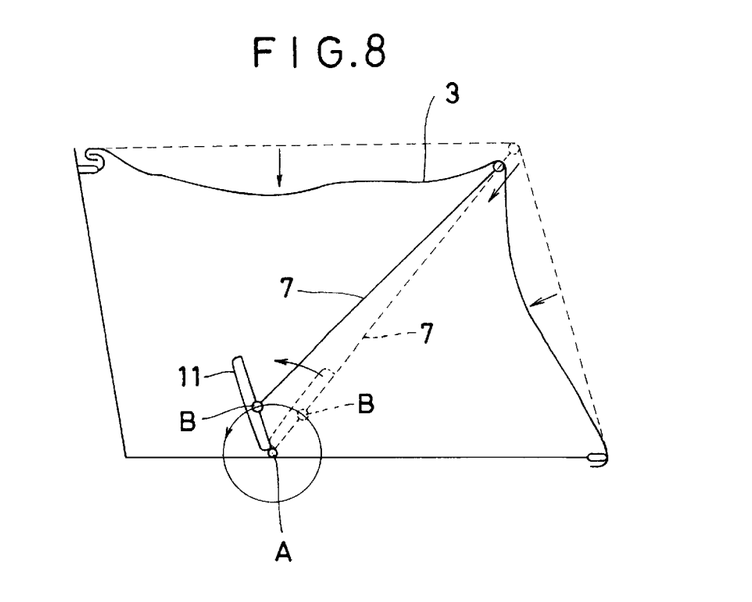
FIG. 8 is a schematic view showing a state in which a canvas top is loosened.

When the handle portion 11 is turned so as to be separated from the pivot portion 12, the frame portion 7a of the canvas top bow 7 moves to the front side of the vehicle body 1 as the pivotally supporting portion b of the pivot portion 12 moves. Thus, the frame portion 7a of the canvas top bow 7 moves so that the joint portion 6 between the canvas cloth 3a constituting the ceiling face and the canvas cloth 3b constituting the rear face approaches the fulcrum A, so that looseness is given to the canvas top 3 (see FIG. 8).

At this time, by the operation of lever, the handle portion 11 can move the pivotally supporting portion b (operation point B) of the pivot portion 12 with a small force with respect to the pivotally supporting portion a (fulcrum A) of the handle portion 11 for the bracket 9.

According to the above-mentioned embodiment, since the handle portion 11 and the pivot portion 12 are formed of a resin, the appearance can be improved. Also, since the pivot shaft 12a of the pivot portion 12 is hidden by the handle portion 11, the pivotally supporting portion b and the like are not seen from the outside, so that the appearance can be improved as compared with the prior art. Further, by fixing the handle portion 11 and the pivot portion 12, the link mechanism L in the adjusting device 8 can be locked, so that the right and left frame portions 7a do not move separately. Therefore, the operation in detaching the canvas top 3 can be made easy.

The present invention is not limited to the above embodiment. For example, the lower end part of the frame portion 7a of the canvas top bow 7 may be pivotally supported at a halfway position of the handle portion 11 directly without using the pivot portion 12. In this case, the locking device 13 for locking the handle portion 11 to the frame portion 7b may be provided with an engagement concave corresponding to the engagement concave 20 of the pivot portion 12 with which the engagement convex of the pin 15 or the like engages.

What is claimed is:

1. A support structure for a canvas top bow on a canvas top automobile having a canvas top and a vehicle body, in which an upper portion of a rear seat is selectively exposed, and a base portion of the canvas top bow is rotatable about a fulcrum position and supported on a side of the vehicle body for spreading and loosening the canvas top, comprising:

an adjusting device provided at a base support portion of the canvas top bow and configured so that a tip end position of the canvas top bow is selectively movable toward and away from the fulcrum position during a loosening stage and a spreading stage of the canvas top and;

a locking device provided on the adjusting device for maintaining a canvas top bow position during the spreading stage of the canvas top.

2. A support structure for a canvas top bow on a canvas top automobile having a vehicle body and a canvas top, which defines a box shape and includes a ceiling surface having a front end portion fixed to the vehicle body, a joint portion engageable with the canvas top bow, a rear surface, and two side surfaces, such that an upper part of a rear seat is selectively exposed by rotating an operation point of a base portion of the canvas top bow, which is supported on a side of the vehicle body, about a fulcrum position so as to move the canvas top bow along an oblique rear direction, press the canvas top bow against the joint portion of a canvas top, and spread the ceiling surface of the canvas top, comprising:

an adjusting device provided at a base support position of the canvas top bow and configured so that a tip end position of the canvas top bow is selectively movable during a loosening stage and a spreading stage of the canvas top, wherein the adjusting device comprises a link mechanism for changing an operation point position without changing the fulcrum position of the base portion of the canvas top bow; and a locking device for maintaining a canvas top bow position during the spreading stage of the canvas top.

3. A support structure for a canvas top bow on a canvas top automobile having a vehicle body and a canvas top including a ceiling surface having an end portion fixed to the vehicle body and a joint portion engageable with the canvas top bow such that an upper part of a rear seat is selectively exposed by rotating a base portion of the canvas top bow, which is supported by the vehicle body, about a fulcrum position so as to move the canvas top bow in a oblique rear direction, press the canvas top bow against the joint portion of a canvas top and spread the ceiling surface of the canvas top, comprising:

a handle portion provided on a side of the vehicle body so as to be turnable in a longitudinal direction of the vehicle body, wherein the base portion of the canvas top bow is pivotally supported at a halfway position of the handle portion;

a locking device provided on the handle portion and the base portion for selectively fixing the handle portion and the base portion together, wherein a stage of spreading the canvas top is configurable by fixing the handle portion to the base portion and by pressing a tip end of the canvas top bow to the canvas top side, and a stage of loosening is configurable by releasing the handle portion from the base portion and turning the handle portion to separate the tip end of the canvas top bow from the canvas top side by changing an operation point position without changing the fulcrum position of the base portion of the canvas top bow; and a link function provided on the handle portion for configuring the stage of loosening the canvas top.

4. A support structure for a canvas top bow on a canvas top automobile according to claim 3, wherein the locking device comprises an engagement convex biasingly projectable and selectively retractable along an axial direction and an engagement concave selectively engageable with the engagement convex for selectively fixing the base portion of the canvas top bow to the handle portion by engaging the engagement convex with the engagement concave and selectively releasing the base portion of the canvas top bow from the handle portion by disengaging the engagement convex from the engagement concave.

5. A support structure for a canvas top bow on a canvas top automobile according to claim 3 or 4, wherein a transverse cross section of the handle portion is formed into a substantially U shape, and the base portion of the canvas top bow is a substantially U-shaped portion.

6. A support structure for a canvas top bow on a canvas top automobile according to claim 1, further comprising:

a second base portion of the canvas top bow rotatable about a second fulcrum position and supported on a second side of the vehicle body for spreading or loosening the canvas top;

a second adjusting device provided at a second base support portion of the canvas top bow and configured for selectively moving the tip end position relative to the second fulcrum position during the loosening and spreading stages; and a second locking device for maintaining the canvas top bow position during the spreading stage of the canvas top.

7. A support structure for a canvas top bow on a canvas top automobile according to claim 1, wherein the adjusting device comprise a linkage for changing an operation point position without changing a position of the fulcrum position of the base portion of the canvas top bow during the loosening and spreading stages.

8. A support structure for a canvas top bow on a canvas top automobile according to claim 1, wherein the adjusting device is configured so that the tip end position of canvas top bow is selectively movable away from the fulcrum position during the stage of spreading and selectively movable toward the fulcrum position during the stage of loosening.

9. A support structure for a canvas top bow on a canvas top automobile according to claim 2, further comprising:

a second base portion of the canvas top bow rotatable about a second fulcrum position and supported on a second side of the vehicle body for spreading or loosening the canvas top;

a second adjusting device provided at a second base support portion of the canvas top bow and configured for selectively moving the tip end position relative to the second fulcrum position during the loosening and spreading stages; and a second locking device for maintaining the canvas top bow position during the spreading stage of the canvas top.

10. A support structure for a canvas top bow on a canvas top automobile according to claim 2, wherein the adjusting device is configured so that the tip end position of canvas top bow is selectively movable away from the fulcrum position during the stage of spreading and selectively movable toward the fulcrum position during the stage of loosening.

11. A support structure for a canvas top bow on a canvas top automobile according to claim 2, wherein the adjusting device is configured so that the operation point position is rotatable about the fulcrum position during the stages of spreading and loosening.

12. A support structure for a canvas top bow on a canvas top automobile according to claim 2, wherein the locking device is provided on a handle portion and the base portion.

13. A support structure for a canvas top bow on a canvas top automobile according to claim 3, further comprising:

a second base portion of the canvas top bow rotatable about a second fulcrum position and supported on a second side of the vehicle body for spreading or loosening the canvas top;

a second handle portion provided on a second side of the vehicle body so as to be turnable in a longitudinal direction of the vehicle body, wherein the second base portion of the canvas top bow is pivotally supported at a halfway position of the second handle portion;

a second locking device provided on both the second handle portion and the second base portion for selectively fixing the handle portion and the base portion together, wherein a stage of spreading the canvas top is configurable by fixing the second handle portion and the second base portion together and by pressing the tip end of the canvas top bow to the canvas top side, and a stage of loosening is configurable by releasing the second handle portion from the second base portion and turning the handle portion to separate the tip end of the canvas top bow from the canvas top side by changing a second operation point position without changing a second fulcrum position of the second base portion of the canvas top bow; and a second link function provided on the second handle portion for configuring the stage of loosening the canvas top.

14. A support structure for a canvas top bow on a canvas top automobile according to claim 3, wherein an engagement convex is provided on the handle portion and an engagement concave is provided on the base portion of the canvas top bow.

15. A support structure for a canvas top bow on a canvas top automobile according to claim 3, wherein the handle portion and the base portion are configured so that the tip end position of canvas top bow is selectively movable away from the fulcrum during the stage of spreading and selectively movable toward the fulcrum during the stage of loosening.

16. A support structure for a canvas top bow on a canvas top automobile according to claim 3, wherein the handle portion and the base portion are configured so that the operation point position is rotatable about the fulcrum position during the stages of spreading and loosening.

* * * * *

UNITED STATES PATENT AND TRADEMARK OFFICE
CERTIFICATE OF CORRECTION

PATENT NO.: 6,068,326

DATED: May 30, 2000

INVENTOR: Hiroyasu Shiromura

It is certified that an error appears in the above-identified patent and that said Letters Patent is hereby corrected as shown below:

In Claim 1, col. 8, lines 17-18, "top and;" should read --top; and--.
In Claim 3, col. 8, line 53, "a oblique" should read --an oblique--.
In Claim 7, col. 9, line 42, "device comprise" should read --device comprises--.

Signed and Sealed this

Third Day of April, 2001

Attest:

NICHOLAS P. GODICI

Attesting Officer      Acting Director of the United States Patent and Trademark Office